United States Patent [19]
Marion et al.

[11] Patent Number: 5,776,320
[45] Date of Patent: Jul. 7, 1998

[54] PROCESS AND APPARATUS FOR REACTIVE DISTILLATION WITH A PARTICULAR DISTRIBUTION OF LIQUID AND VAPOR PHASES

[75] Inventors: Marie-Claire Marion, Villeurbanne; Jean-Charles Viltard, Valence; Philippe Travers, Rueil Malmaison; Isabelle Harter, Lyons; Alain Forestiere, Vernaison, all of France

[73] Assignee: Institut Francais Du Petrole, France

[21] Appl. No.: 686,101

[22] Filed: Jul. 24, 1996

[30] Foreign Application Priority Data

Jul. 24, 1995 [FR] France .................. 95 09060
Dec. 27, 1995 [FR] France .................. 95 15532

[51] Int. Cl.⁶ ............................................ B01D 3/34
[52] U.S. Cl. ........................................... 203/29
[58] Field of Search ................................. 203/29

[56] References Cited

FOREIGN PATENT DOCUMENTS

| 0 231 841 | 8/1987 | European Pat. Off. |
| 0 470 655 | 2/1992 | European Pat. Off. |
| 0 571 163 | 11/1993 | European Pat. Off. |
| 1 801 538 | 6/1970 | Germany |
| 366519 | 2/1963 | Switzerland |

*Primary Examiner*—Edward J. Cain
*Attorney, Agent, or Firm*—Millen, White, Zelano & Branigan, P.C.

[57] ABSTRACT

The invention concerns a reactive distillation process carried out in a reactive distillation zone which includes at least one catalytic zone flanked by two distillation zones, the vapor from the distillation circulating from bottom to top so as to be in practically no contact with the catalyst, and the liquid circulating from the upper distillation zone (5) to a substantially central zone at the bottom of the catalytic zone without contacting the catalyst, then circulating radially below the catalytic zone via at least one means (20) so as to be introduced into a liquid distribution zone (23), then circulating through the catalytic bed (8) in the catalytic zone, following which the liquid is recovered via at least one liquid overflow means (19) in a lower distillation zone (14).

The invention also concerns an apparatus for reactive distillation.

23 Claims, 6 Drawing Sheets

PROCESS AND APPARATUS FOR REACTIVE DISTILLATION WITH A PARTICULAR DISTRIBUTION OF LIQUID AND VAPOR PHASES

The invention concerns a reactive distillation process (also known as catalytic distillation) in which at least one chemical reaction is carried out in the presence of a catalyst at the same time as separation of the reaction mixture obtained by distillation. The invention also concerns an apparatus for reactive distillation.

The process and apparatus of the invention can be applied to a number of balanced reactions in the liquid phase in which the reaction product can be isolated by distillation under the temperature and pressure conditions under which the reaction is carried out, particularly the preparation of tertiary alkyl ethers such as methyltertiobutylether (MTBE), methyltertioamylether (TAME), ethyltertiobutylether (ETBE) and ethyltertioamylether (TAEE), by a catalytic reaction of the appropriate olefin (isobutene or isopentene) with the appropriate alcohol (methanol or ethanol). Regarding etherfication by reactive distillation in particular, a number of processes have been proposed in the prior art.

U.S. Pat. No. 4,847,430 describes an etherification process in which one of its characteristics is the disposition of passages or shafts for the ascending distillation vapour, thus avoiding the disadvantages of passing the vapour through the catalytic bed.

U.S. Pat. No. 5,130,102 describes a reactive distillation column comprising a zone in which a catalytic reaction and separation by distillation of the products of the reaction occur concurrently, this zone comprising at least one reaction "tray" supporting a particulate catalyst and at least one distillation tray, more particularly a bubble cap tray, the reaction tray being "coupled" with the distillation tray by means of a continuous liquid mass immersing the catalyst in its lower zone and the distillation tray in its upper zone. The reaction tray comprises a shaft (in fact, the shaft of the bubble cap which is extended to take the presence of the catalytic mass and its depth into account), to guide the vapour ascending from the zone below the "coupled" assembly towards a vapour distributor located below the distillation tray. The depth of the liquid mass between the reaction tray and the distillation tray must be sufficient to avoid entrainment of the catalyst particles. The liquid phase flows from the upper part of the coupled assembly by overflowing over a weir then via a downcomer either to a conventional distillation tray, or to a further "coupled" assembly located below the "coupled" assembly under consideration. Similarly, the reaction tray of one "coupled" assembly is supplied with liquid phase by overflowing over a weir via a downcomer, either from a conventional distillation tray or from a further "coupled" assembly located above the "coupled" assembly under consideration.

U.S. Pat. No. 5,368,691 describes a process which employs a configuration such that the reaction zones, which alternate with the distillation zones, are clearly separated from the latter, i.e., with no continuous liquid mass between one reaction zone and the neighbouring distillation zone. That application describes a process for reactive distillation characterized in that:

the reactants, which are generally separate or as a mixture, pure or diluted, are introduced to at least one level in a reactive distillation column which includes:
(a) at least one catalytic reaction zone including an appropriate catalyst bed; and
(b) at least one distillation zone constituted by at least one distillation tray, each distillation zone being separated from the consecutive catalytic zone(s);

distillation conditions in said column are maintained so as to have a liquid phase and a vapour phase in said column;

a portion, preferably all of the liquid phase is circulated from bottom to top through the catalyst in each catalytic zone;

a portion, preferably all of the vapour phase from the distillation is circulated from bottom to top through each distillation zone, so that said vapour phase is in contact with the liquid phase in the distillation zones;

a portion, preferably all of the desired product is recovered at one extremity of said reactive distillation column; and a portion, preferably all of any diluent is recovered from the reactants and any excess of reactant(s) at the other extremity of said column.

Preferably, all of the vapour phase from the distillation is circulated so that it is only in contact with the liquid phase in the distillation zones and not in the catalytic zones.

The process and apparatus of the invention, described below, constitute an improvement to the process and apparatus described in U.S. Pat. No. 5,368,691.

The process and apparatus of the invention can be applied to a number of balanced reactions in the liquid phase in which the reaction product can be isolated by distillation under the temperature and pressure conditions under which the reaction is carried out. They are applicable to the alkylation of aromatic hydrocarbons, generally benzene, by catalytic reaction with an appropriate olefin, for example ethylene or propylene, to form the corresponding alkylbenzene, for example ethylbenzene or cumene. They are also applicable, for example, to the isomerisation of paraffins, to olefin isomerisation reactions, or to the production of butene by hydroisomerisation of 1-butene to 2-butene. They are also applicable to the hydrogenation of benzene and light olefins (containing 6 or more carbon atoms in their molecule) in a light reformate, or to the hydrogenation of diolefins and/or acetylenic compounds in light fractions from petroleum or petrochemical cuts. Preferably, they apply to the etherification of an isoolefin (for example isobutene or isopentene) with an aliphatic monoalcohol (such as methanol or ethanol), in particular the preparation of tertiary alkyl ethers such as methyltertiobutylether (MTBE), methyltertioamylether (TAME), ethyltertiobutylether (ETBE) or ethyltertioamylether (TAEE), by the catalytic reaction of the appropriate olefin (isobutene or isopentene) with the appropriate alcohol (methanol or ethanol, depending on the case).

The reactive distillation process of the invention is such that:
the reactants, which may be diluted with a diluent, one of the reactants possibly being in excess, are introduced to at least one level in a reactive distillation column which includes:
(a) at least one catalytic reaction zone including at least one catalytic bed comprising the catalyst;
(b) at least one distillation zone, or lower distillation zone, located below the said catalytic zone;
(c) at least one further distillation zone, or upper distillation zone, located above the said catalytic zone;

the distillation conditions are maintained so as to have a liquid phase and a vapour phase in the reactive distillation zone;

a major portion, preferably practically all of the liquid is circulated from bottom to top through the catalyst in the catalytic zone;

a major portion of the vapour is circulated from bottom to top in the catalytic zone, so that said vapour is in practically no contact with the catalyst;

a portion, preferably the major portion, of the desired reaction product is recovered; and a portion, preferably the major portion, of any diluent and the reactants is recovered;

the process being characterized in that:

the major portion of the liquid from the upper distillation zone is collected by at least one collecting means so that the liquid arrives in a substantially central zone of the catalytic zone, below each catalytic bed of the catalytic zone, with substantially no contact with the catalyst;

the major portion of the liquid is circulated substantially radially below said catalytic bed by at least one substantially radial circulation means so as to introduce the liquid into at least one liquid distribution zone;

the major portion of the liquid is recovered after its passage through the catalytic bed by at least one liquid overflow means, so that the liquid overflows into the lower distillation zone.

In the process of the invention, the reactive distillation zone consists of a catalytic reaction zone, a lower distillation zone which is the (bottom) stripping zone and an upper distillation zone which is the rectification zone.

The collecting means can be such that the liquid arrives practically free of vapour below the catalytic bed, i.e., that the means has any suitable form which will correctly supply the distribution zone with at least one substantially radial liquid circulation means, in particular to prevent any gas from becoming entrained in the liquid. Thus the liquid is distributed in the substantially radial circulation means then in the distribution zone without excessive turbulence.

The liquid distribution zone, which is supplied by at least one substantially radial circulation means, regulates and homogenises the liquid before its entry into each catalytic bed of the catalytic zone. Thus one of the advantages of the present invention is an improvement to the circulation of liquid in each catalytic bed of the catalytic zone. As a consequence, the process is such that the liquid spreads over the whole cross section of the reactive distillation zone which is accessible to it before entering the catalytic bed, in at least one liquid distribution zone.

Preferably, the major portion of the liquid collected from the upper distillation zone circulates in a substantially central zone of the catalytic zone.

Preferably, the major portion of the liquid which overflows into the lower distillation zone via at least one overflow means passes into a substantially peripheral zone of the catalytic zone.

When the reaction includes the presence of at least one gaseous reactant, the process of the invention can comprise the introduction of at least one gaseous reactant, preferably hydrogen, for each catalytic bed in the catalytic zone.

In a first preferred implementation of the process of the invention, the collecting means is principally located in a substantially central zone of the catalytic zone, the major portion of the liquid which is collected from the upper distillation zone circulates in a substantially central zone of the catalytic zone, the major portion of the liquid which overflows into the lower distillation zone passes to a substantially peripheral zone of the catalytic zone, and the vapour from the lower distillation zone which circulates in the catalytic zone circulates principally in a substantially central zone of the catalytic zone. In this case, the substantially radial circulation means of each catalytic bed comprises at least one distribution arm, preferably 2 to 10 distribution arms, and more preferably 2 to 8 distribution arms.

In the first preferred implementation of the process of the invention, almost all of the vapour from the lower distillation zone which circulates in a substantially central zone of the catalytic zone passes to a substantially central zone of the catalytic zone. In this implementation, the liquid overflow means is located in a substantially peripheral zone of the catalytic zone, and preferably the means is such that it permits practically no passage of the vapour phase in the upward direction.

Further, it is preferred that in this implementation, the vapour from the lower distillation zone which circulates in a substantially central zone of the catalytic zone is in practically no contact with the liquid which circulates in a substantially central zone of the catalytic zone.

In a second preferred implementation of the process of the invention, the collecting means is principally located in a substantially central zone of the catalytic zone, the major portion of the liquid from the upper distillation zone which is collected circulates in a substantially central zone of the catalytic zone, the major portion of the liquid which overflows into the lower distillation zone passes to a substantially peripheral zone of the catalytic zone, and the vapour from the lower distillation zone which circulates in the catalytic zone principally circulates in a substantially peripheral zone of the catalytic zone. Thus in a first variation which is a third preferred implementation of the process of the invention, at least a portion, preferably the major portion, of the vapour from the lower distillation zone which circulates in a substantially peripheral zone of the catalytic zone is in contact with the liquid circulating principally in the overflow means. And in a second variation which is thus a fourth preferred implementation of the process of the invention, the vapour from the lower distillation zone which circulates in a substantially peripheral zone of the catalytic zone has substantially no contact with the liquid circulating in the overflow means.

Whatever the implementation of the process of the invention, the substantially radial circulation means can comprise at least one distribution arm, preferably 2 to 10 distribution arms, and more preferably 2 to 8 distribution arms.

Whatever the implementation, the vapour produced during the catalytic reaction in each catalytic bed of the catalytic zone joins the vapour from the lower distillation zone which has traversed the catalytic bed in contact with the catalyst above the catalytic bed.

Any other implementation of the process of the invention which combines the different preferred implementations of the process of the invention can be envisaged. As an example, it is possible to combine the third and first preferred implementations described above, i.e., a portion of the vapour from the lower distillation zone circulates in a substantially peripheral zone of the catalytic zone and the other portion of the vapour circulates in a substantially central zone of the catalytic zone.

The reactive distillation zone of the invention is at least one catalytic column. In cases which are known to the skilled person where the use of a single column causes problems, it is generally preferable to divide the column and use at least two columns which, placed end to end, form the column. Thus the rectification zone, catalytic distillation zone and bottom stripping zone are distributed over the columns. In practice, the rectification zone or the stripping zone, preferably the stripping zone, is generally in at least one column which is different to the column comprising the catalytic zone.

The upper zone, or rectification zone, in the reactive distillation zone generally comprises either at least one distributing tray which may be located above a zone comprising at least one packing to accomplish distillation, or at least one distillation tray, which may be conventional, also any combination of packing(s), distributing tray(s) and distillation tray(s) which can accomplish distillation using any technique which is known to the skilled person.

The stripping zone of the reactive distillation zone generally comprises at least one distributing tray which is optionally located above a zone comprising at least one packing which accomplishes distillation, or at least one distillation tray, which may be conventional, also any combination of packing(s), distributing tray(s) and distillation tray(s) which can accomplish distillation using any technique which is known to the skilled person.

The packing which may be used in the process of the present invention is selected as a function of the efficiency necessary for the distillation operation. The packing can be selected from packings which are well known to the skilled person, such as solids in the form of rings, poly-lobed extrudates or saddle packing. Non limiting examples of packing are Raschig rings, Pall rings, Intos rings, Berl saddle packing, Novalox saddle packing and Intalox saddle packing. However, the packing can also be selected from structured packings, for example FLEXIPAC (registered trade mark) sold by Koch, or SULZER CHEMTECH or SULZER (registered trade marks) sold by Sulzer.

The distributing tray which may be used in the process of the present invention is a simple tray which allows the upward passage of vapour and collection then overflow of liquid, as in any distributing tray which is known to the skilled person, in particular if the major portion of the distillation zone to which it belongs is composed of packing.

When a distillation tray is used in accordance with the present invention, the tray can be selected from distillation trays which are known to the skilled person, in particular perforated trays, bubble cap trays, or valve trays, and it comprises:

at least one discontinuous plate, i.e., provided with discontinuities for the passage of vapour, each plate being intended to agitate and mix liquid and vapour streams;

at least one downcomer (or chute), preferably located at the centre or at the periphery of each distillation tray, to contain the liquid and control the regularity of its flow (the liquid previously on the plate of the tray flows through the downcomer); and at least one weir (or lip) bordering each downcomer, to hold the liquid on the plate of the tray at a certain level and thus to control the regularity of the evacuation of the liquid from the operating table.

With the present invention, it can be envisaged, for example, that each distillation zone located between two catalytic beds comprises an odd number of distillation trays, preferably double pass trays (alternating tray(s) with an overflow means in the central portion of the tray(s) and tray(s) with overflow means at the peripheral portion, as is well known to the skilled person).

The catalyst to be installed in each catalytic bed of the catalytic zone is generally constituted by catalytic particles. It can be in any suitable form, in particular in the form of substantially cylindrical particles or substantially spherical particles, the dimensions of the catalyst particles being generally in the range 0.1 mm to 20 mm. The nature of the catalyst depends on the desired reaction, as is well known to the skilled person. When synthesising methyltertiobutylether, for example, a sulphonic resin type catalyst is generally used, for example a sulphonated polystyrene-divinylbenzene resin with a granulometry which is generally in the range 0.1 mm to 1.2 mm.

In each catalytic bed in the catalytic zone, the catalyst can be enclosed in at least one envelope which is permeable to liquid but impermeable to catalytic particles (i.e., does not allow the solid catalyst particles to pass through it), the envelope being constituted, for example, by a fabric sheet, a synthetic material sheet (for example polypropylene) or a metallic material.

The catalyst can also be loose, i.e., freely packed, inside each catalytic bed in the catalytic zone. In this case, in order to hold the catalyst in place and prevent it from becoming entrained in the liquid stream passing through it, in general each catalytic bed in the catalytic zone rests on any type of apparatus which will allow the passage of liquid but is impermeable to catalytic particles, such as a Johnson screen or Johnson nozzles distributed regularly on a surface which is impermeable to streams of gas, liquid or solids. Advantageously, the apparatus is slightly raised with respect to the inlet of the substantially radial circulation means, at the bottom of the catalytic zone, to create a distribution zone located partially beneath the catalytic bed of the catalytic zone.

It is also possible to provide an upper screen over each catalytic bed in the catalytic zone, which is impermeable to the passage of catalytic particles and permeable to liquid and to gas, to confine the particles in the bed. However, it is also possible, and this constitutes a preferred implementation of the invention, to use any type of apparatus which will allow the passage of liquid but which is impermeable to catalytic particles at the level of the overflow means over which the liquid flows after its passage through the catalytic zone, such as a Johnson screen. Similarly, it is also possible to provide an upper screen above the vapour circulation means, which is permeable to catalytic particles and permeable to ascending vapour which traverses the catalytic bed with practically no contact with the particles, to prevent the catalyst from becoming entrained during abnormal operation of the column.

When the catalyst is loose packed, a fixed bed, expanded bed or fluidised bed can be used. Whether loose packed or enclosed in at least one envelope, it can generally have a void space of between 30% and 70%.

During operation of the reactive distillation zone in the process of the invention, because of possible entrainment of fragments of catalytic particles (fines) constituting the catalyst by the liquid, it may be of advantage to provide for collection of the liquid flowing, for example, from the lower catalytic bed of the catalytic zone located at the lowest position in the catalytic bed, extracting the liquid, filtering it in at least one filtering apparatus (located generally outside the reactive distillation zone) and reintroducing it into the catalytic zone between the position from which it was extracted and the lower distillation zone. The lower catalytic bed is the only bed in the catalytic zone if it only comprises a single catalytic bed, or the catalytic bed located lowermost in the catalytic zone if the latter comprises at least two catalytic beds. Filtering eliminates all the fragments of catalyst which may be entrained by the liquid phase, and in particular prevents them from arriving at the bottom of the reactive zone.

The catalyst is charged into the catalytic zone using any means which is known to the skilled person, such as a manhole or any distribution means with an inlet located just above each catalytic bed, preferably to allow sealed charging of the catalyst (for example in an organic medium). The catalyst is discharged using any means which is known to the skilled person. Discharging can thus be achieved by suction, for example by means of a manhole, or by a discharge line.

The shafts for the liquid and vapour phases inside the reactive distillation zone, in particular inside the catalytic zone, are features of one of the aspects of the process of the invention.

The reactive distillation apparatus of the invention comprises:

a) at least one catalytic reaction zone including at least one catalytic bed comprising a catalyst;

b) at least one distillation zone, or lower distillation zone, located below the said catalytic zone;

c) at least one further distillation zone, or upper distillation zone, located above the said catalytic zone;

at least one means for circulating the major portion, preferably almost all, of the liquid from bottom to top through the catalyst in each catalytic bed;

at least one means for circulating vapour from bottom to top of the catalytic zone such that said vapour is in practically no contact with the catalyst;

said apparatus being characterized in that it comprises:

at least one collecting means adapted so that the liquid from the upper distillation zone arrives in a substantially central zone of the catalytic zone below each catalytic bed of the catalytic zone, said collecting means comprising a collecting zone in its portion above the catalytic zone, and said means comprising at least one conduit which allows the passage of liquid from top to bottom of the catalytic zone substantially without contact with the catalyst;

at least one substantially radial liquid circulation means below each catalytic bed of the catalytic zone so as to introduce the liquid into at least one liquid distribution zone;

at least one liquid overflow means which comprises at least one conduit such that the liquid, after its passage through the catalytic bed, overflows into the lower distillation zone.

In the apparatus of the invention, the reactive distillation zone consists of a catalytic reaction zone, a lower distillation zone which is the (bottom) stripping zone and an upper distillation zone which is the rectification zone.

The collecting zone of the collecting means can release the vapour, i.e., it can correctly supply the distribution zone via the conduit of the means then via at least one substantially radial liquid circulation means, which in particular prevents gas from being entrained in said liquid. Thus the liquid is distributed in the conduit without excessive turbulence then in the substantially radial circulation means and finally joins the distribution zone.

The liquid distribution zone, supplied by at least one substantially radial circulation means, can regulate and homogenise the liquid before it enters each catalytic bed of the catalytic zone. Thus one of the advantages of the present invention is an improvement in the circulation of liquid in each catalytic bed of the catalytic zone. As a consequence, the process is such that the liquid spreads over the whole cross section of the reactive distillation zone which is accessible to it before entering the catalytic bed, in at least one liquid distribution zone.

Preferably, the collecting means is principally located in a substantially central zone of the catalytic zone.

Preferably, the major portion of the liquid which overflows into the lower distillation zone passes through a substantially peripheral zone of the catalytic zone. Thus the overflow means comprises at least one conduit, and each conduit of said means is principally located at a substantially peripheral zone of the catalytic zone.

When the reaction includes at least one gaseous reactant, the apparatus of the invention can comprise at least one means for introducing the gaseous reactant, preferably hydrogen, for each catalytic bed in the catalytic zone.

In a first preferred embodiment of the apparatus of the invention, the collecting means is principally located at a substantially central zone of the catalytic zone, the overflow means is principally located at a substantially peripheral zone of the catalytic zone, and the means for circulating the vapour from the lower distillation zone is located at a substantially central zone of the catalytic zone. Preferably, the means for circulating the vapour from the lower distillation zone comprises at least one conduit, each conduit of the circulation means being distinct from any conduit of the liquid collecting means. In this case, the substantially radial circulation means is preferably a "spider" type apparatus comprising at least one distribution arm, preferably 2 to 10 distribution arms, and more preferably 2 to 8 distribution arms.

In a first preferred embodiment of the apparatus of the invention, the apparatus is preferably such that the liquid overflow means is such that it allows practically no vapour to pass in an upward direction, i.e., that each conduit of the liquid overflow means comprises at least one means which allows practically no vapour to pass in an upward direction.

In this embodiment, the means for circulating the vapour phase from the lower distillation zone preferably comprises at least one conduit, and each conduit of that means is distinct both from each conduit of the collecting means and each conduit of the overflow means.

In a second preferred embodiment of the apparatus of the invention, the collecting means is principally located at a substantially central zone of the catalytic zone, the overflow means is principally located at a substantially peripheral zone of the catalytic zone and the means for circulating the vapour from the lower distillation zone is located at a substantially peripheral zone of the catalytic zone. Thus in a first variation which is thus a third preferred embodiment of the apparatus of the invention, at least a portion, preferably the major portion, of the vapour from the lower distillation zone which circulates in a substantially peripheral zone of the catalytic zone is in contact with the liquid circulating principally in the overflow means. Thus the means for circulating vapour comprises at least one conduit, and at least one conduit of the means is also a conduit of the liquid overflow means, and preferably each conduit of the means is also a conduit of the liquid overflow means. In a second variation which is thus a fourth preferred embodiment of the apparatus of the invention, the vapour from the lower distillation zone which circulates in a substantially peripheral zone of the catalytic zone has substantially no contact with the liquid circulating principally in the overflow means. Thus the means for circulating vapour comprises at least one conduit, each conduit of the circulation means being distinct from each conduit of the overflow means.

Preferably, whatever the embodiment of the apparatus of the invention, the means for circulating the liquid from bottom to top through the catalyst comprises at least one means for injecting the liquid into each catalytic bed of the catalytic zone, preferably a nozzle. In this case, when the reaction to be encouraged is a reaction comprising the introduction of at least one gaseous reactant which is hydrogen, i.e., the reaction comprises hydrogenation, it is thus generally necessary to add a hydrogen introduction apparatus for each catalytic bed of the catalytic zone, for example using one of the three techniques described below. Thus the catalytic zone comprises at least one means for injecting liquid and at least one means for introducing hydrogen into each catalytic bed of the catalytic zone. In a first technique, the hydrogen introduction apparatus is located before the liquid injection apparatus and thus before the catalytic bed. In a second technique, the hydrogen introduction apparatus is located at the level of the liquid injection apparatus so that the hydrogen is introduced into the liquid before the catalytic bed. In a third technique, the hydrogen introduction apparatus is located after the liquid injection apparatus and thus in the catalytic bed, preferably not far from the means for injecting liquid into the catalytic bed. The terms "before" and "after" as used hereinbefore are relative to the direction of circulation of the liquid which passes through the catalytic bed.

Whatever the embodiment of the apparatus of the invention, the substantially radial circulation means can comprise at least one distribution arm, preferably 2 to 10 distribution arms, and more preferably 2 to 8 distribution arms.

Whatever the embodiment used, the vapour produced during the catalytic reaction in each catalytic bed of the catalytic zone rejoins the vapour from the lower distillation zone, which traverses the bed without contacting the catalyst, above the catalytic bed.

Any other embodiment of the apparatus of the invention can be envisaged which combines the different preferred embodiments of the apparatus of the invention. As an example, the first and third preferred embodiments described above can be combined, i.e., a portion of the vapour from the lower distribution zone circulates in at least one conduit in a substantially peripheral zone of the catalytic zone and the other portion of the vapour circulates in at least one conduit in a substantially central zone of the catalytic zone.

The reactive distillation apparatus of the invention consists of at least one catalytic column. In cases which are known to the skilled person where the use of a single column causes problems, it is generally preferable to divide the column and use at least two columns which, placed end to end, form the column, i.e., the rectification zone (or upper zone), catalytic distillation zone and stripping zone (or lower zone) are distributed over the columns. In practice, the rectification zone or the stripping zone, preferably the stripping zone, is generally in at least one column which is different to the column comprising the catalytic zone.

The rectification zone in the apparatus of the invention generally comprises either at least one distribution tray which may be located above a zone comprising at least a packing which accomplishes the distillation, or at least one distillation tray, which may be conventional, or any combination of packing(s), distribution tray(s) and distillation tray(s) which will accomplish distillation using any technique which is known to the skilled person.

Similarly, the stripping zone in the apparatus of the invention generally comprises either at least one distribution tray which may be located above a zone comprising at least a packing which accomplishes distillation, or at least one distillation tray, which may be conventional, or any combination of packing(s), distribution tray(s) and distillation tray(s) which will accomplish distillation using any technique which is known to the skilled person.

The characteristics of the distribution tray, packing material, catalyst and charging and discharging of the catalyst for the apparatus of the invention are the same as those given above in respect of the process of the invention.

The reactive distillation apparatus of the invention can comprise at least one means for collecting a portion of the liquid flowing, for example, from the lower catalytic bed in the catalytic zone located lowermost in the catalytic zone over the lower distillation zone, at least one filtering means (generally located externally to the reactive distillation zone), which can retain any fragments of catalytic particles constituting the catalyst which may become entrained in the liquid phase, and at least one means for distributing liquid (which liquid is substantially free of catalytic particle fragments) to the catalytic zone, generally between the position from which it is extracted and the lower distillation zone.

The shafts for the liquid and vapour phase inside the reactive distillation zone, in particular inside the catalytic zone, are dictated by the internal organs of the reactive distillation zone and are features of one aspect of the invention.

Further, for exothermic reactions, for example the synthesis of tertiary alkyl ethers, one of the advantages of the process and apparatus of the invention is that the upflow circulation of the liquid phase through the catalytic beds also allows easy evacuation of the vapour phase generated in the catalyst by the heat of the reaction.

The process and apparatus of the invention are illustrated in the accompanying figures.

Figure 1:
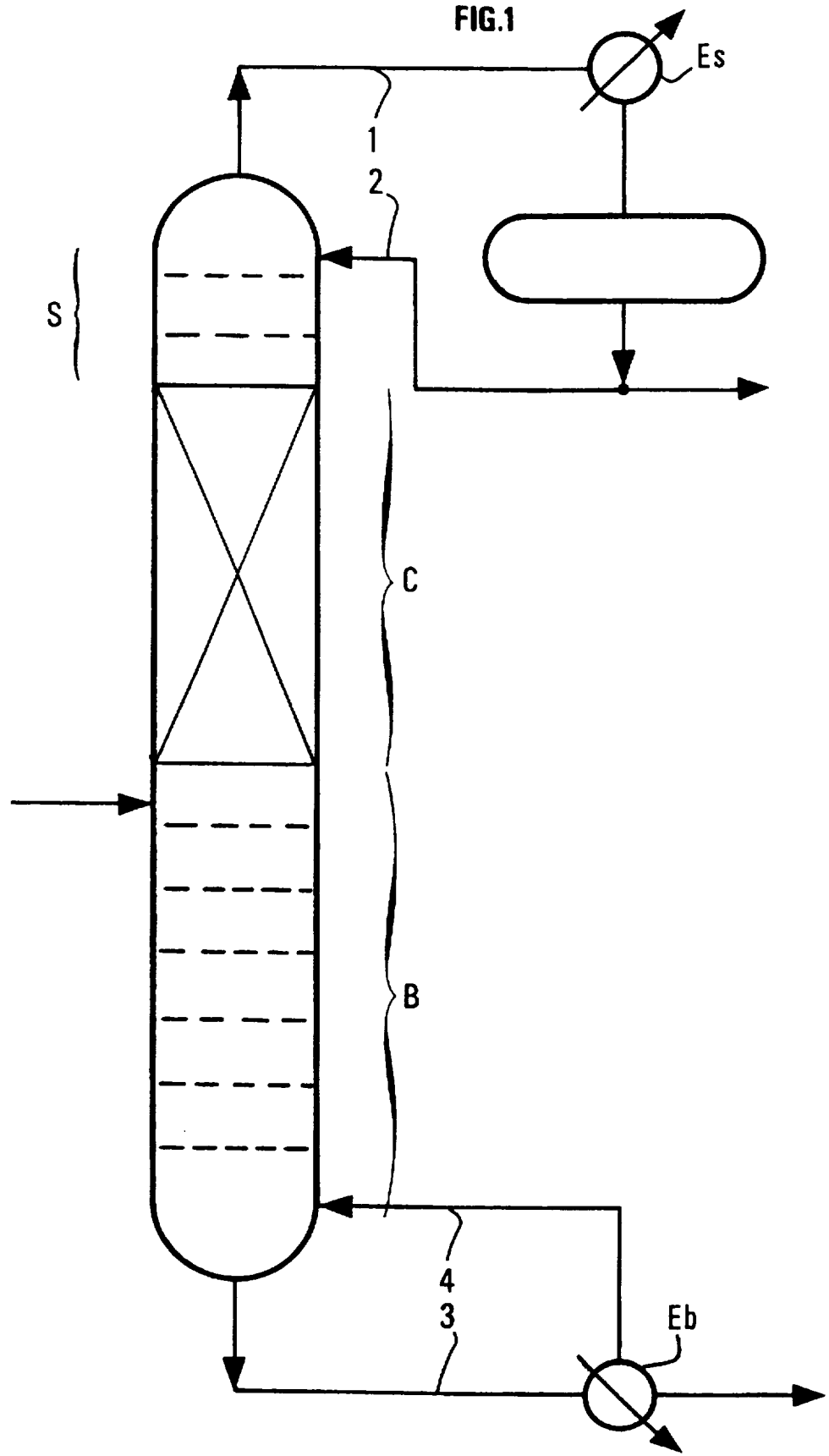
FIG. 1 shows a schematic diagram of the general arrangement of the zone.

The reactive distillation zone used in the process of the invention shown in FIG. 1 is a catalytic column which essentially comprises three zones, namely: a catalytic zone (C), in which distillation and the chemical reaction occur, one encouraging the other, a head (S) (or rectification zone) and a bottom (B) (or stripping zone).

Head (S) is equipped with a line 1 for evacuating vapours of the most volatile constituents and a line 2 for introducing a reflux liquid constituted by a fraction of the vapours which have been condensed in exchanger Es.

Bottom (B) is equipped with a line 3 for evacuating the least volatile constituents in liquid form and a line 4 for introducing reboil vapour generated by partial vaporisation of at least a portion of the constituents in exchanger Eb. It is also provided with one or more conduits for optional introduction of all or a portion of the reactants.

Catalytic zone (C) internally receives a liquid phase generated by the reflux introduced to the head of the reactive distillation zone and a vapour phase generated by the reboil vapour introduced to the bottom of the reactive distillation zone, and from an external source, with optional addition of at least one of the reactants to at least one level, pure or diluted by alcohol, for example, when the apparatus is used to synthesise ethers. FIG. 1 does not show such an addition.

One disposition of a catalytic bed of the catalytic zone, associated with two distillation zones and forming one of the characteristics of the apparatus of the invention, is described below with reference to FIGS. 2, 2A, 2B and 2C, which show two variations for the first preferred embodiment of the apparatus of the invention. The catalytic zone comprises a single catalytic bed 8 with its upper portion bordered by a distillation tray 5 while its lower portion is bordered by a distillation tray 14. Distillation tray 5, which comprises a central weir 7 connecting the tray to a downcomer 6, is located above the catalytic bed and is either the lowest tray in zone (S), or the only tray in zone (S) if the latter comprises a single tray, or the lowest tray in a distillation zone in catalytic zone (C), or the only tray in the zone comprised in zone (C) if the latter comprises a single tray. Distillation tray 14, which comprises a central weir 12 connecting the tray to a downcomer 13, is located below the catalytic bed and is either the highest tray in zone (B), or the only tray in zone (B) if the latter comprises a single tray, or the highest tray in a distillation zone in catalytic distillation zone (C), or the only tray in the zone comprised in zone (C) if the latter comprises a single tray.

Catalytic bed 8 is adapted to be traversed from bottom to top by the liquid phase without being traversed by the vapour phase from the distillation zone.

The catalyst to be installed in the ensemble of catalytic beds 8 can be in any suitable shape, in particular in the form of catalytic particles which are substantially cylindrical or substantially spherical in shape, the dimensions of the catalyst particles being in the range 0.1 mm to 20 mm. In order to hold the catalyst in place and prevent it from being entrained in the liquid stream traversed by it, the catalytic bed rests on a lower screen 15a. Lower screen 15a is advantageously slightly raised with respect to the influx of the liquid distribution means 17, which is at the bottom (tray 15b) of the catalytic zone, in order to create a liquid distribution zone 23, into which the liquid from the substantially radial liquid circulation means below the catalytic zone enters, before the liquid phase circulates into the catalytic bed.

An upper screen 16a can also be provided, which screen is impermeable to the passage of catalytic particles, to confine the particles in the catalytic bed. Alternatively, any means can be provided, such as means 16b or 16c, shown in FIG. 2, which prevent the catalyst from spilling out of the catalytic bed during operation. Means such as those with reference numerals 16a, 16b or 16c shown in FIG. 2 can also be combined.

Figure 2:
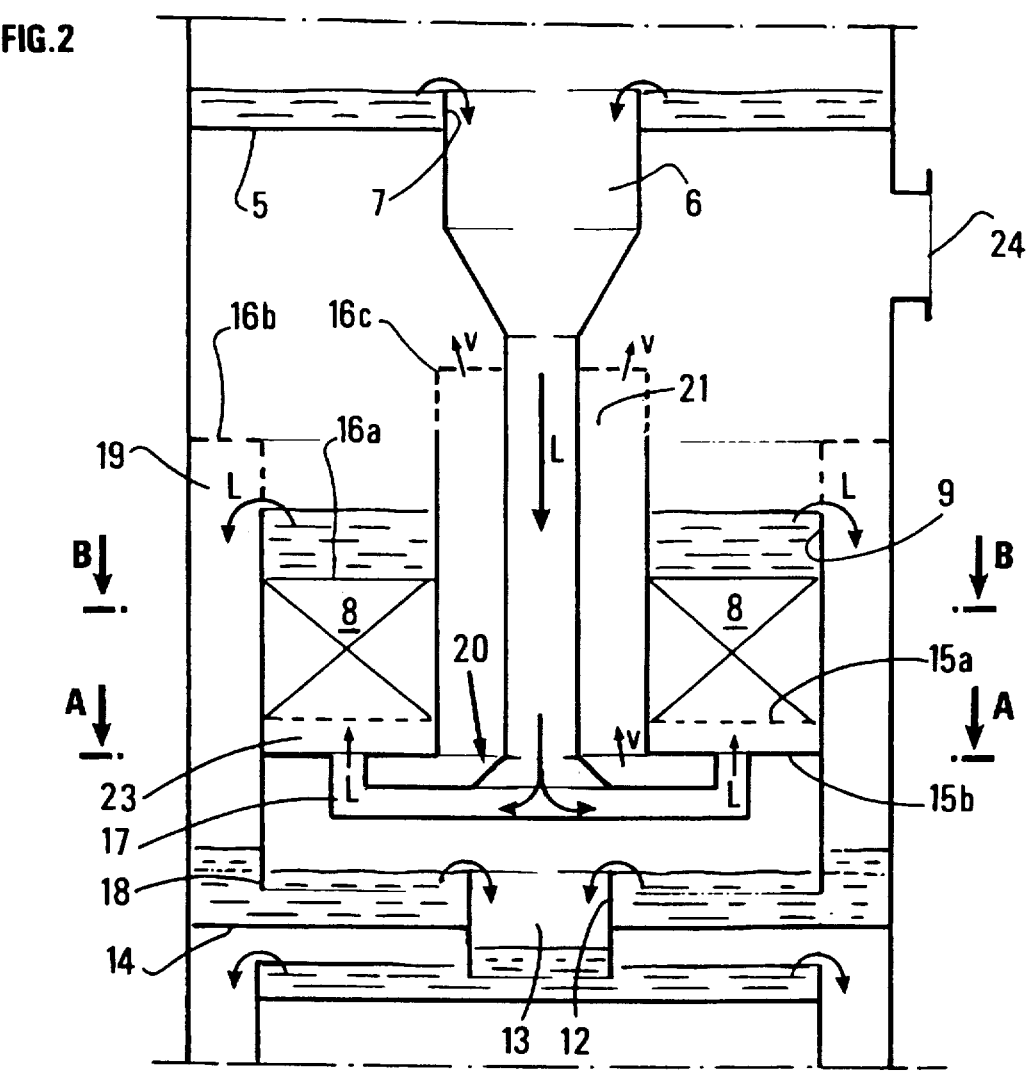
FIGS. 2, 2A, 2B and 2C show the configuration of the distillation zones and the catalytic zones which form at least a portion of the zone in a first preferred embodiment of the apparatus of the invention.
Figure 2A:
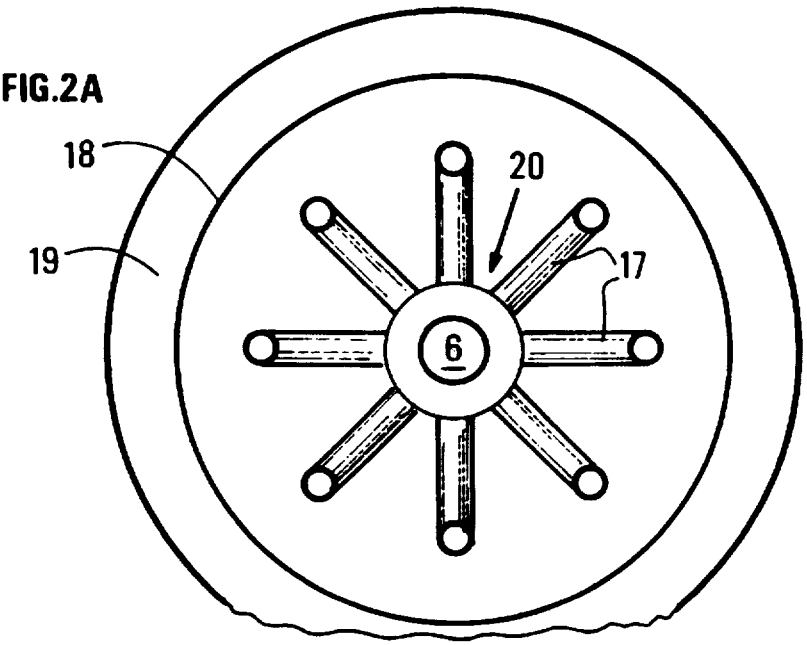

More particularly, in the first preferred embodiment of the apparatus of the invention, shown in FIGS. 2, 2A, 2B and 2C, FIGS. 2B and 2C each represent a possible cross section of FIG. 2 along the line BB, and FIG. 2A shows a cross section along the line AA of FIG. 2. Catalytic bed 8 receives the liquid phase flowing from distillation tray 5 by overflowing over central weir 7 and down downcomer 6. The supply of distillation liquid to the catalytic bed is one of the characteristic features of the present invention. It is accomplished by dint of a substantially radial liquid circulation means 20 comprising eight supply arms 17, which allow an upflow of vapour into conduit 21 from the lower distillation zone to the upper distillation zone without contact with the liquid. FIG. 2A clearly shows a particular possible structure of means 20 comprising distribution arms 17; reference numerals 18 and 19 are explained below.

The liquid phase moves from bottom to top through catalytic bed 8 and pours onto distillation tray 14 by over-flowing over weir 9 and flowing down downcomer 19. Within the context of the present invention, any means can be positioned above weir 9, such as means 16b shown in FIG. 2, which means is permeable to liquid and impermeable to catalytic particles. An example is a Johnson screen. Tray 14 has a central downcomer 13 and a weir 12. Preferably, as shown in FIGS. 2 and 2A, downcomer 19 is such that it comprises a means 18 which permits practically no vapour to pass upwards into downcomer 19. In this case, tray 14 clearly has no liquid-vapour contact means below the downcomer 19 which can generate distillation vapour.

Figure 2B:
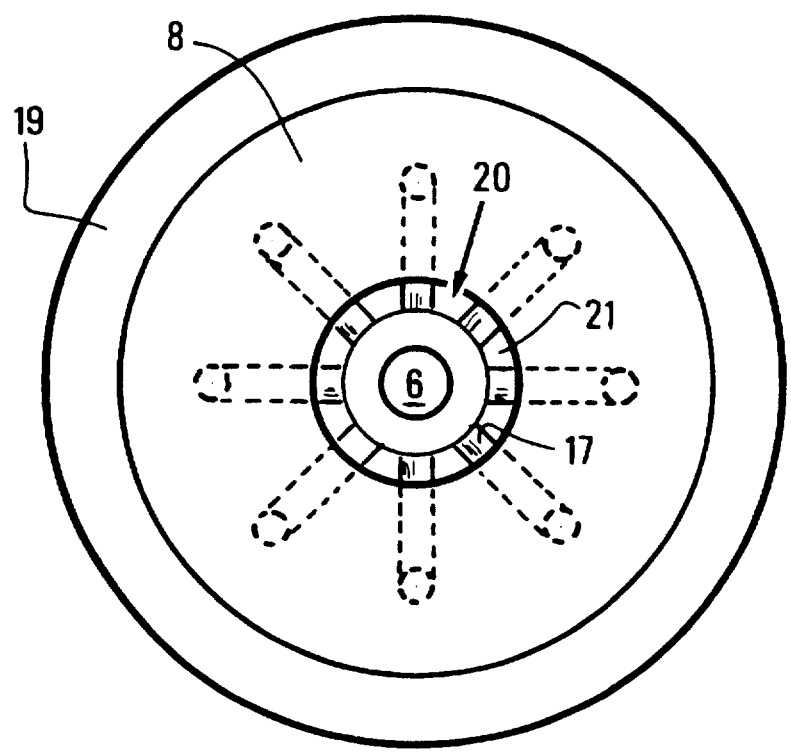
Figure 2C:
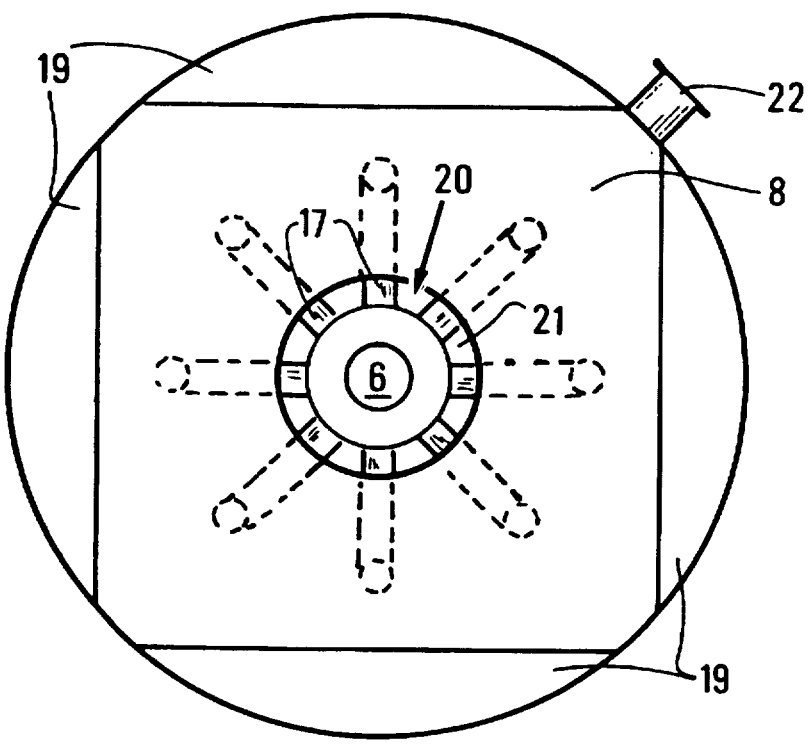

The vapour phase generated by the lower distillation zone circulates upwards in a substantially central zone of the catalytic zone via a conduit 21, passage towards conduit 21 being made possible by the construction of distribution means 20 (see in particular FIGS. 2A, 2B and 2C). Within the context of the present invention, any means such as means 16c, shown in FIG. 2, which means is permeable to vapour and impermeable to catalytic particles, for example a Johnson screen, can be located at the outlet to conduit 21, the outlet being located above the catalytic bed.

The catalyst is generally charged into the reactive distillation zone using any means known to the skilled person, such as manhole 24 shown in FIG. 2. A number of discharge configurations are possible for the first preferred embodiment of the apparatus of the invention, two of which are shown in FIGS. 2B and 2C which each show a possible cross section along the line BB in FIG. 2. The catalyst can also be discharged by suction, for example via manhole 24 when the configuration is that of FIG. 2B, or via a discharging line 22 specially provided for this purpose when the configuration is that of FIG. 2C.

The process and apparatus of the invention have the particular advantage of good control of the circulation of liquid inside the catalytic zones. In particular, it is preferable within the context of the invention that every cross section of the catalytic zone is such that the liquid circulating in the catalytic bed at the level of that cross section can distribute itself freely over that level, i.e., that all the catalytic particles constituting the catalyst are in contact in that cross section. Further, the existence of a distribution zone 23 (FIG. 2) can improve catalytic bed irrigation by a substantial amount. Still further, the use of an upflow of liquid through the catalyst beds causes the beds to expand and have some mobility, which prevents the catalytic beds from clogging. Finally, liquid downcomer 6 is optimised so that the descending liquid flows in homogeneously before its distribution via means 20.

Figure 4:
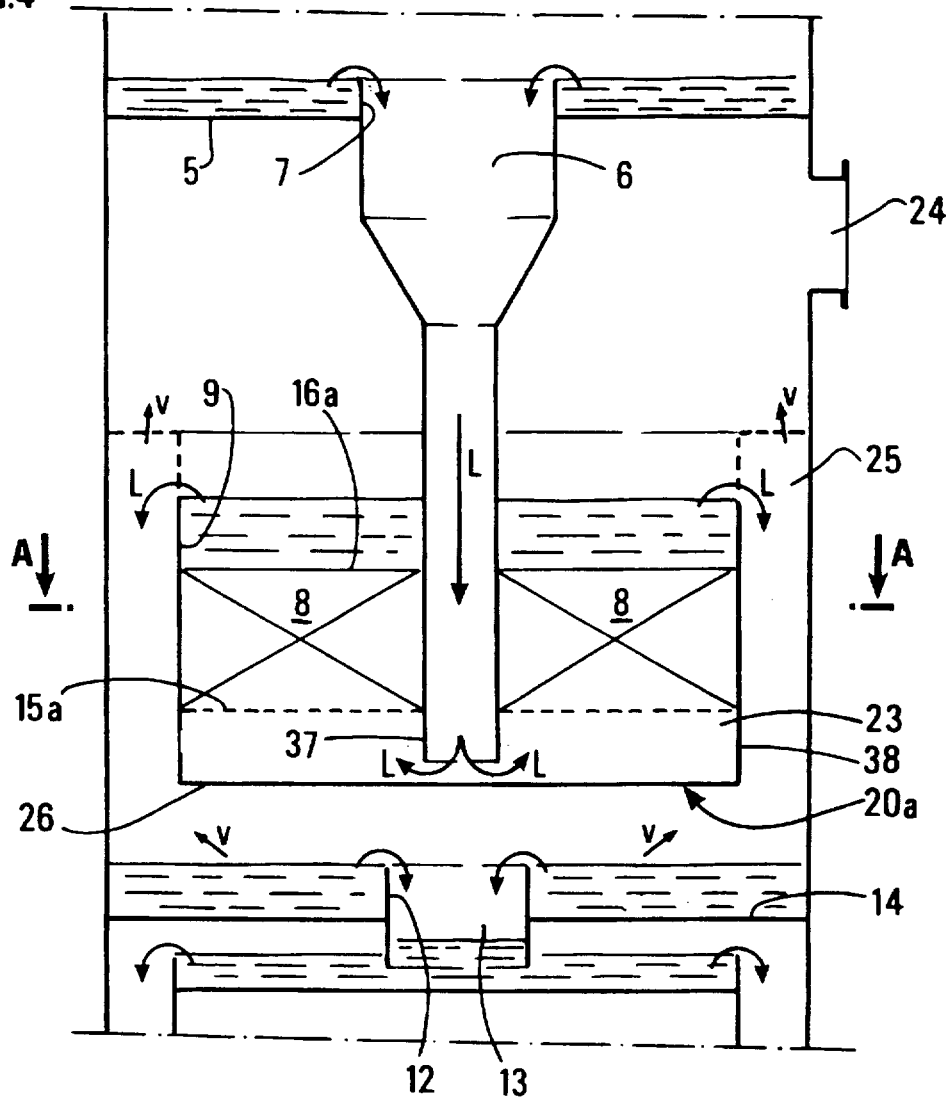
FIGS. 3, 4, 4A and 4B show the configuration of the distillation zones and catalytic zones which form at least a portion of the zone in a third preferred embodiment of the apparatus of the invention.
Figure 3:
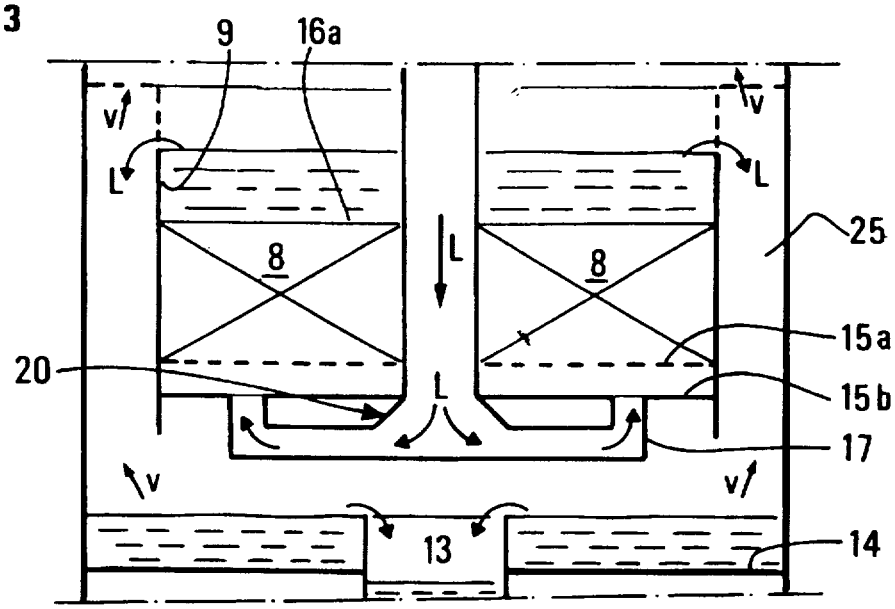

FIGS. 3, 4, 4A and 4B show two variations of the third preferred embodiment of the apparatus of the invention. The reference numerals used in FIG. 2 are also used in FIGS. 3 and 4, but in this case the major portion of the vapour circulates in a substantially peripheral zone, rising via downcomer 25 through which flows the liquid overflowing over weir 9 which is passed through catalytic bed 8. In this case, substantially radial liquid circulation means 20a has a substantially different form to means 20 shown in FIG. 2. In FIG. 4, it essentially comprises a tube 37 and is associated with a cylinder 38 and a plate 15b which retains the catalyst, to create distribution zone 23. In contrast to the case of FIG. 2, plate 15b is omitted, the bottom of the catalytic zone being constituted by plate 26. This, however, is but one possibility. It is also possible (see FIG. 3) for the apparatus to be composed of means 20 of FIG. 2 with supply arms 17, combined with a plate 26.

Figure 4A:
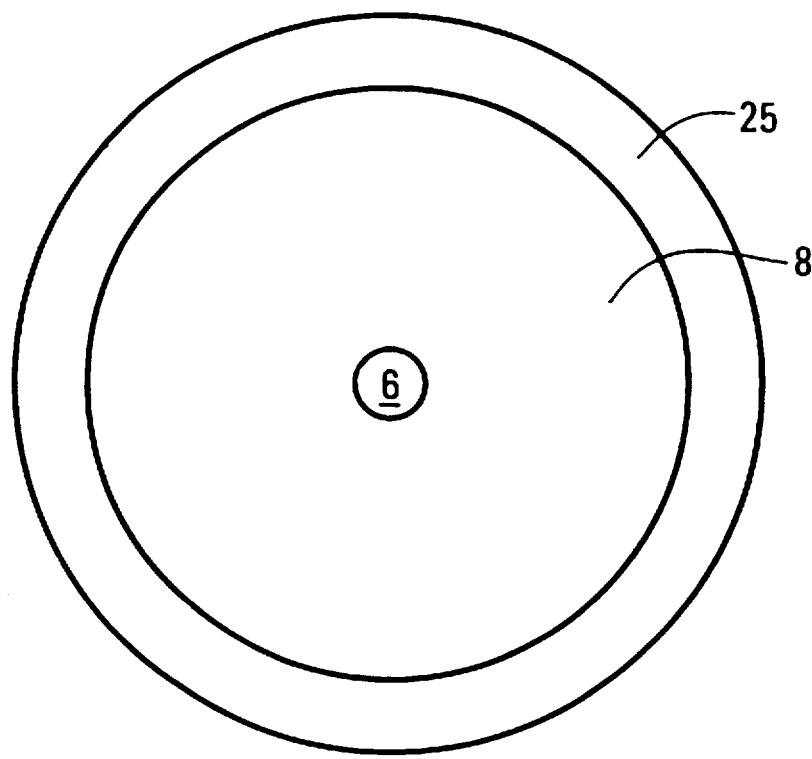
Figure 4B:
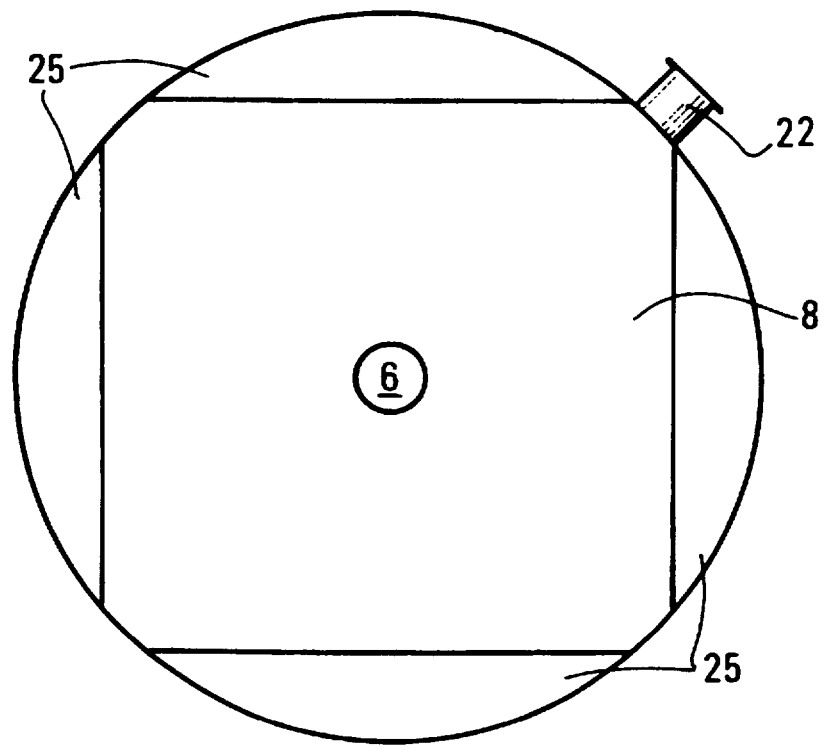

FIGS. 4A and 4B show two possible cross sections of FIG. 4 along the line AA. The catalyst can be discharged by suction, for example via manhole 24 when the configuration is that of FIG. 4A, or via a discharge line 22 when the configuration is that of FIG. 4B.

Figure 5:
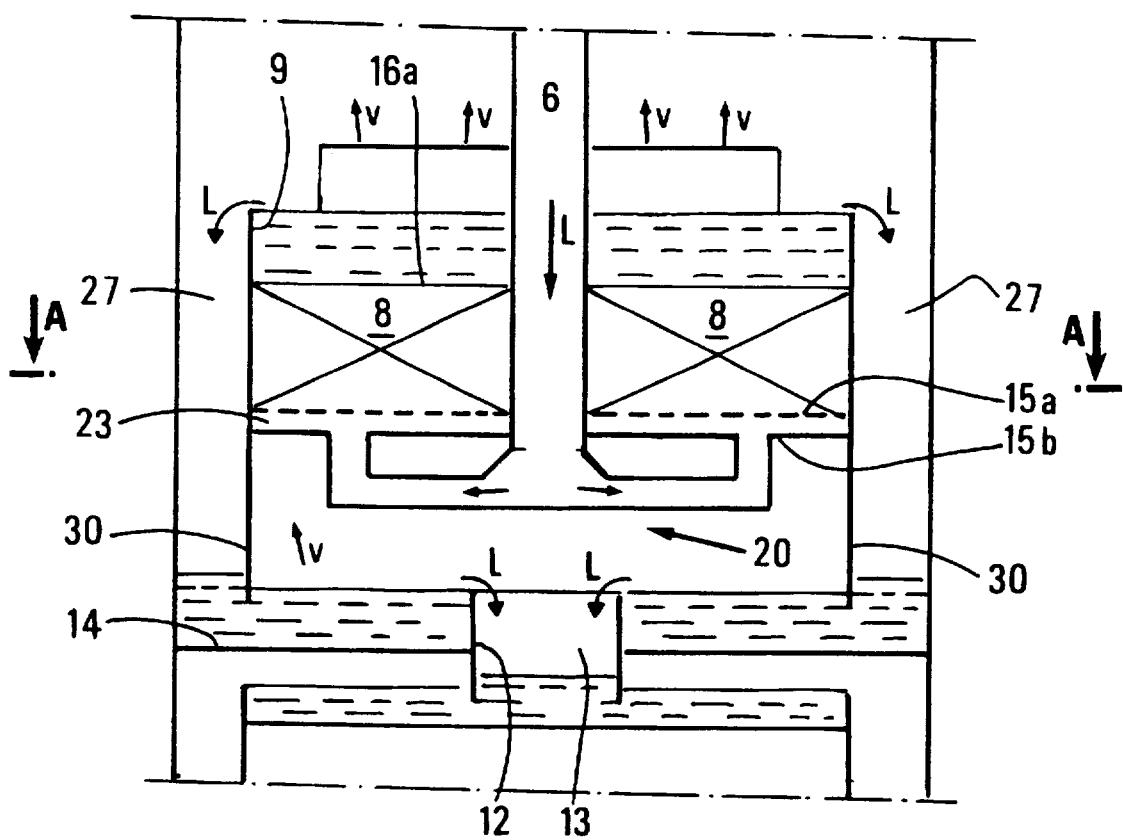
FIGS. 5 and 5A show the configuration of the distillation zones and catalytic zones which form at least a portion of the zone in a fourth preferred embodiment of the apparatus of the invention. Similar devices in the figures are represented by the same numerals.
Figure 5A:
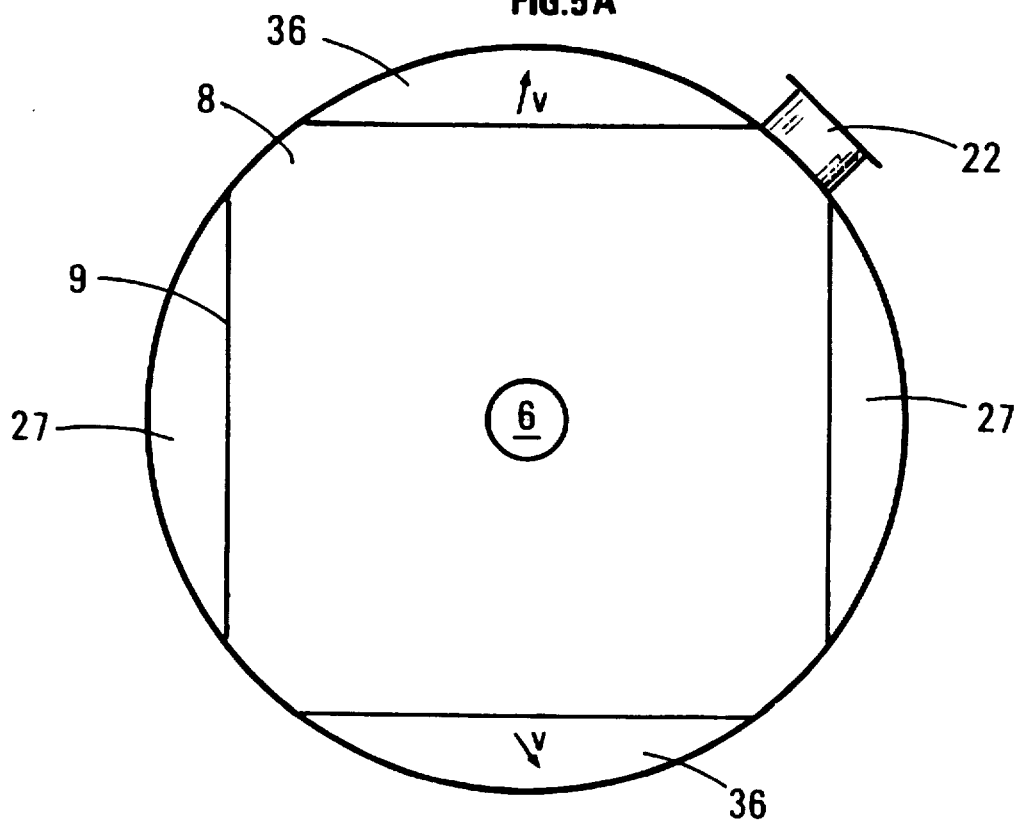

FIGS. 5 and 5A illustrate the fourth preferred embodiment of the apparatus of the invention. The reference numerals used in FIG. 2 are used in FIG. 5, as explained above, but in this case the major portion of the vapour circulates in a substantially peripheral zone, rising via two spaces 36 while the liquid which traverses catalytic bed 8 overflows over two weirs 9 into two downcomers 27. In this case, substantially radial liquid circulation means 20a is substantially the same as that described above for the third preferred embodiment of the apparatus of the invention shown in FIG. 3. FIG. 5A shows a cross section through the line AA in FIG. 5. The catalyst is discharged via discharge line 22. In this case, of course, the apparatus is provided with every suitable means to substantially completely prevent vapour from rising in liquid downcomers 27, and to prevent overflow of a portion of the liquid which has traversed catalytic bed 8 into spaces 36.

As described above, the process and apparatus of the invention can be applied to a variety of balanced reactions in the liquid phase, in which the reaction product is isolated by distillation under the temperature and pressure conditions under which the reaction is carried out, in particular the alkylation of aromatic hydrocarbons by an appropriate olefin, paraffin isomerisation, olefin isomerisation, or the production of 2-butene by hydroisomerisation. Preferably, the process and apparatus are particularly applicable to etherification of an isoolefin (for example isobutene or isopentene) by an aliphatic monoalcohol (for example methanol or ethanol) to form the corresponding ethers. The conditions under which these reactions are carried out are well known to the skilled person. However, the conditions for the synthesis of methyltertiobutylether are given below by way of indication.

The usual conditions are generally a pressure in the range 0.4 MPa to 1.6 MPa, a temperature at the bottom of the reactive distillation zone, which depends on the selected pressure, in the range 110° C. to 170° C. and a temperature at the head of the reactive distillation zone, which depends on the selected pressure, in the range 40° C. to 90° C. In general, the reflux ratio with respect to the distillate is in the range 0.5:1 to 5:1. Using this process, almost all of the isobutene can be converted to produce high purity MTBE, in general at least 98 mole %. The feed containing isobutene is generally constituted by a $C_4$ cut (hydrocarbon feed in which the major portion is constituted by compounds containing 4 carbon atoms per molecule), particularly from a steam cracking unit, from catalytic cracking or from the dehydrogenation of isobutane. In a first reaction zone, it is brought into contact with methanol, under reaction conditions which are known to the skilled person. This balanced reaction can convert a portion of the isobutene (in general 70% to 90%) to MTBE. The mixture from this first zone is then treated using the reactive distillation process of the invention or the reactive distillation apparatus of the invention. The feed containing unconverted isobutene and methanol is generally introduced just below the catalytic zone. Additional methanol is generally introduced just below the catalytic zone. This may also be added at several points along the catalytic zone. The catalyst is placed in the catalytic zones of the reactive distillation zone as described above.

The following examples illustrate the invention.

EXAMPLE 1

In this example, carried out in accordance with the first preferred implementation of the process of the invention, a feed was treated from a first etherification reaction section, where 88% of the isobutene was converted. The composition of the supply to the reactive distillation column of the invention is given in the third column of Table 1. It takes into account a supplemental addition of alcohol to the column, representing 0.5 parts per 100 by weight.

TABLE 1

|  | Unit feed | Catalytic column feed | Column bottom (weight %) | Column head (weight %) |
|---|---|---|---|---|
| isobutene | 22.5 | 2.70 | <0.002 | 0.62 |
| n-butane | 7.0 | 7.0 | <0.01 | 10.64 |
| butenes | 39.0 | 39.0 | <0.01 | 59.28 |
| isobutane | 18.0 | 18.0 | <0.01 | 27.36 |
| methanol | 13.5 | 2.69** | — | 2.10 |
| MTBE |  | 31.11 | 99.2 | <0.02 |
| TOTAL (g) | 100 | 100.5 |  |  |
| isobutene conversion |  | 88% |  | 98.2% |

**a methanol supplement (0.5 parts per 100) was supplied to the column.

The column used was 350 cm high and 5 cm in diameter. It had an upper zone (rectification zone) equipped with 8 double pass distillation trays and a lower zone (stripping zone) equipped with 15 double pass distillation trays. The catalytic zone was constituted by alternating distillation zones and reaction zones in accordance with the first preferred embodiment of the apparatus of the invention (see FIGS. 2, 2A, 2B and 2C). There were five catalytic beds in the catalytic zone, each containing 6 $cm^3$ of catalyst (sulphonic resin, sold by Rohm & Haas under the trade name Amberlyst 15), separated from each other by three double pass distillation trays.

The column was operated at a relative pressure of 0.7 MPa with a reflux ratio of 1:1.

The feed was supplied to the twenty-sixth tray (counting from top to bottom). Supplemental methanol was injected to the tray just above the first catalytic bed (i.e., to tray 8). After startup, a temperature profile of 62° C. at the head to 139° C. at the bottom was established in the column.

For a supply of 1800 g/h (plus 9 g/h of methanol) to the column, a distillate with the composition shown in Table 2 was obtained overhead from the column at a flow rate of 1183 g/h. 623 g/h of an MTBE product with a purity of more than 99% was obtained from the bottom. The isobutene conversion of the column was 85%.

EXAMPLE 2

In this example, carried out in accordance with the third preferred implementation of the process of the invention, a feed was treated from a first etherification reaction section, where 88% of the isobutene was converted. The composition of the supply to the catalytic distillation column of the invention is given in the third column of Table 2. It takes into account a supplemental addition of alcohol to the column, representing 0.5 parts per 100 by weight.

TABLE 2

|  | Unit feed | Catalytic column feed | Column bottom (weight %) | Column head (weight %) |
|---|---|---|---|---|
| isobutene | 22.5 | 2.70 | <0.002 | 0.66 |
| n-butane | 7.0 | 7.0 | <0.01 | 10.63 |

TABLE 2-continued

|  | Unit feed | Catalytic column feed | Column bottom (weight %) | Column head (weight %) |
|---|---|---|---|---|
| butenes | 39.0 | 39.0 | <0.01 | 59.24 |
| isobutane | 18.0 | 18.0 | <0.01 | 27.34 |
| methanol | 13.5 | 2.69** | — | 2.12 |
| MTBE |  | 31.11 | 99.2 | <0.02 |
| TOTAL(g) | 100 | 100.5 |  |  |
| isobutene conversion |  | 88% |  | 98.1% |

**a menthal supplement (0.5 parts per 100) was supplied to the column.

The column used was 350 cm high and 5 cm in diameter. It had an upper zone (rectification zone) equipped with a Sulzer packing and a lower zone (stripping zone) also equipped with a Sulzer packing. The catalytic zone was constituted by alternating distillation zones and reaction zones in accordance with the third preferred embodiment of the apparatus of the invention (see FIGS. 4 and 4A). There were five catalytic beds in the catalytic zone, each containing 6 cm$^3$ of catalyst (sulphonic resin, sold by Rohm & Haas under the trade name Amberlyst 15), separated from each other by three double pass distillation trays.

The column was operated at a relative pressure of 0.7 MPa with a reflux ratio of 1:1.

The feed was supplied to the twenty-sixth tray (counting from top to bottom). Supplemental methanol was injected to the tray just above the first catalytic bed (i.e., to tray 8). After startup, a temperature profile of 62° C. at the head to 139° C. at the bottom was established in the column.

For a supply of 1800 g/h (plus 9 g/h of methanol) to the column, a distillate with the composition shown in Table 2 was obtained overhead from the column at a flow rate of 1182 g/h. 622 g/h of an MTBE product with a purity of more than 99% was obtained from the bottom. The isobutene conversion of the column was 84%.

EXAMPLE 3

In this example, carried out in accordance with the fourth preferred implementation of the process of the invention, a feed was treated from a first etherification reaction section, where 88% of the isobutene was converted. The composition of the supply to the catalytic distillation column, in accordance with the invention, is given in the third column of Table 3. it takes into account a supplemental addition of alcohol to the column, representing 0.5 parts per 100 by weight.

TABLE 3

|  | Unit feed | Catalytic column feed | Column bottom (weight %) | Column head (weight %) |
|---|---|---|---|---|
| isobutene | 22.5 | 2.70 | <0.002 | 0.57 |
| n-butane | 7.0 | 7.0 | <0.01 | 10.65 |
| butenes | 39.0 | 39.0 | <0.01 | 59.32 |
| isobutane | 18.0 | 18.0 | <0.01 | 27.38 |
| methanol | 13.5 | 2.69** | — | 2.08 |
| MTBE |  | 31.11 | 99.1 | <0.02 |
| TOTAL (g) | 100 | 100.5 |  |  |
| isobutene conversion |  | 88% |  | 98.3% |

**a methanol supplement (0.5 parts per 100) was suplied to the column.

The column used was 350 cm high and 5 cm in diameter. It had an upper zone (rectification zone) equipped with a Sulzer packing and a lower zone (stripping zone) also equipped with a Sulzer packing. The catalytic zone was constituted by alternating distillation zones and reaction zones in accordance with the fourth embodiment of the apparatus of the invention (see FIGS. 5 and 5A). There were five catalytic beds in the catalytic zone, each containing 6 cm$^3$ of catalyst (sulphonic resin, sold by Rohm & Haas under the trade name Amberlyst 15), separated from each other by three double pass distillation trays.

The column was operated at a relative pressure of 0.7 MPa with a reflux ratio of 1:1.

The feed was supplied to the twenty-sixth tray (counting from top to bottom). Supplemental methanol was injected to the tray just above the first catalytic bed (i.e., to tray 8). After startup, a temperature profile of 62° C. at the head to 139° C. at the bottom was established in the column.

For a supply of 1800 g/h (plus 9 g/h of methanol) to the column, a distillate with the composition shown in Table 3 was obtained overhead from the column at a flow rate of 1183 g/h. 623 g/h of a MTBE product with a purity of more than 99% was obtained from the bottom. The isobutene conversion of the column was 86%.

We claim:

1. A reactive distillation process in which:
   the reactants, which may be diluted with a diluent, one of the reactants possibly being in excess, are introduced to at least one level in a reactive distillation column which includes:

(a) at least one catalytic reaction zone including at least one catalytic bed comprising the catalyst;

(b) at least one distillation zone, or lower distillation zone, located below the said catalytic zone;

(c) at least one further distillation zone, or upper distillation zone, located above the said catalytic zone;

the distillation conditions are maintained so as to have a liquid phase and a vapour phase in the reactive distillation zone;

a major portion of the liquid is circulated from bottom to top through the catalyst in the catalytic zone;

a major portion of the vapour is circulated from bottom to top in the catalytic zone, so that said vapour is in practically no contact with the catalyst;

a portion of the desired product is recovered; and a portion of any diluent and the reactants is recovered;

the process being characterized in that:

the major portion of the liquid from the upper distillation zone is collected by at least one collecting means so that the liquid arrives in a substantially central zone of the catalytic zone, below each catalytic bed of the catalytic zone, with substantially no contact with the catalyst;

the major portion of the liquid is circulated substantially radially below said catalytic bed by at least one substantially radial circulation means so as to introduce the liquid into at least one liquid distribution zone;

the major portion of the liquid is recovered after its passage through the catalytic bed by at least one liquid overflow means, so that the liquid overflows into the lower distillation zone.

2. A process according to claim 1, in which the liquid from the upper distillation zone which is collected arrives below said catalytic bed practically free of vapour.

3. A process according to claim 1, comprising the introduction of at least one gaseous reactant into each catalytic bed of the catalytic zone.

4. A process according to claim 1, in which the major portion of the liquid collected from the upper distillation zone circulates in a substantially central zone of the catalytic zone.

5. A process according to claim 1, in which the major portion of the liquid which overflows into the lower distillation zone via at least one overflow means passes into a substantially peripheral zone of the catalytic zone.

6. A process according to claim 1, in which the major portion of the liquid which is collected from the upper distillation zone circulates in a substantially central zone of the catalytic zone, the major portion of the liquid which overflows into the lower distillation zone passes to a substantially peripheral zone of the catalytic zone, and the vapour from the lower distillation zone which circulates in the catalytic zone circulates in a substantially central zone of the catalytic zone.

7. A process according to claim 1, in which the major portion of the liquid which is collected from the upper distillation zone circulates in a substantially central zone of the catalytic zone, the major portion of the liquid which overflows into the lower distillation zone passes to a substantially peripheral zone of the catalytic zone, and the vapour from the lower distillation zone which circulates in the catalytic zone circulates in a substantially peripheral zone of the catalytic zone.

8. A process according to claim 7, in which the vapour from the lower distillation zone which circulates in a substantially peripheral zone of the catalytic zone has substantially no contact with the liquid which principally circulates in the overflow means.

9. A process according to claim 1, in which the substantially radial circulation means comprises at least one distribution arm.

10. A reactive distillation apparatus comprising:
 a) at least one catalytic reaction zone including at least one catalytic bed comprising a catalyst;
 b) at least one distillation zone, or lower distillation zone, located below the said catalytic zone;
 c) at least one further distillation zone, or upper distillation zone, located above the said catalytic zone;
 at least one means for circulating the major portion of the liquid from bottom to top through the catalyst in each catalytic bed;
 at least one means for circulating vapour from bottom to top of the catalytic zone such that said vapour is in practically no contact with the catalyst;
said apparatus being characterized in that it comprises:
 at least one collecting means adapted so that the liquid from the upper distillation zone arrives in a substantially central zone of the catalytic zone below each catalytic bed of the catalytic zone, said collecting means comprising a collecting zone in its portion above the catalytic zone, and said means comprising at least one conduit which allows the passage of liquid from top to bottom of the catalytic zone substantially without contact with the catalyst;
 at least one substantially radial liquid circulation means below each catalytic bed of the catalytic zone so as to introduce the liquid into at least one liquid distribution zone;
 at least one liquid overflow means which comprises at least one conduit such that the liquid, after its passage through the catalytic bed, overflows into the lower distillation zone.

11. An apparatus according to claim 10, in which the collecting zone of the collecting means allows vapour to be released.

12. An apparatus according to claim 10, comprising at least one means for introducing a gaseous reactant into each catalytic bed in the catalytic zone.

13. An apparatus according to claim 9, in which the collecting means is principally located in a substantially central zone of the catalytic zone.

14. An apparatus according to claim 10, in which the liquid overflow means which overflows into the lower distillation zone is principally located in a substantially peripheral zone of the catalytic zone.

15. An apparatus according to claim 10, in which the collecting means is principally located in a substantially central zone of the catalytic zone, the overflow means is principally located in a substantially peripheral zone of the catalytic zone and the means for circulating the vapour from the lower distillation zone is located in a substantially central zone of the catalytic zone.

16. An apparatus according to claim 10, in which the collecting means is principally located in a substantially central zone of the catalytic zone, the overflow means is principally located in a substantially peripheral zone of the catalytic zone and the means for circulating the vapour from the lower distillation zone is located in a substantially peripheral zone of the catalytic zone.

17. An apparatus according to claim 16, in which the means for circulating vapour comprises at least one conduit, and at least one conduit of said means is also a conduit of the liquid overflow means.

18. An apparatus according to claim 10, in which the means for circulating liquid from bottom to top through the catalyst comprises at least one means for injecting said liquid into each catalytic bed of the catalytic zone.

19. An apparatus according to claim 18, in which each catalytic bed in the catalytic zone comprises at least one hydrogen introduction apparatus.

20. An apparatus according to claim 19, in which the hydrogen introduction apparatus is located before the liquid injection apparatus.

21. An apparatus according to claim 19, in which the hydrogen introduction apparatus is located at the level of the liquid injection apparatus.

22. An apparatus according to claim 19, in which the hydrogen introduction apparatus is located after the liquid injection apparatus.

23. An apparatus according to claim 10, in which the substantially radial circulating means comprises at least one distribution arm.

\* \* \* \* \*

UNITED STATES PATENT AND TRADEMARK OFFICE
CERTIFICATE OF CORRECTION

PATENT NO. : 5,776,320
DATED : July 7, 1998
INVENTOR(S) : Marie-Claire MARION, Jean-Charles VILTARD, Philippe TRAVERS, Isabelle HARTER, and Alain FORESTIERE It is certified that error appears in the above-identified patent and that said Letters Patent is hereby corrected as shown below:

Insert the following claims:

24. A process according to claim 5, in which the major portion of the liquid which is collected from the upper distillation zone circulates in a substantially central zone of the catalytic zone, the major portion of the liquid which overflows into the lower distillation zone passes to a substantially peripheral zone of the catalytic zone, and the vapour from the lower distillation zone which circulates in the catalytic zone circulates in a substantially central zone of the catalytic zone.

25. A process according to claim 24, comprising the introduction of at least one gaseous reactant into each catalytic bed of the catalytic zone.

26. A process according to claim 5, in which the major portion of the liquid which is collected from the upper distillation zone circulates in a substantially central zone of the catalytic zone, the major portion of the liquid which overflows into the lower distillation zone passes to a substantially peripheral zone of the catalytic zone, and the vapour from the lower distillation zone which circulates in the catalytic zone circulates in a substantially peripheral zone of the catalytic zone.

27. A process according to claim 26, comprising the introduction of at least one gaseous reactant into each catalytic bed of the catalytic zone.

28. A process according to claim 27, in which the vapour from the lower distillation zone which circulates in a substantially peripheral zone of the catalytic zone has substantially no contact with the liquid which principally circulates in the overflow means.

UNITED STATES PATENT AND TRADEMARK OFFICE
CERTIFICATE OF CORRECTION

PATENT NO. : 5,776,320
DATED : July 7, 1998
INVENTOR(S) : Marie-Claire MARION, Jean-Charles VILTARD, Philippe TRAVERS, Isabelle HARTER, and Alain FORESTIERE It is certified that error appears in the above-identified patent and that said Letters Patent is hereby corrected as shown below:

29. An apparatus according to claim 14, in which the collecting means is principally located in a substantially central zone of the catalytic zone, the overflow means is principally located in a substantially peripheral zone of the catalytic zone and the means for circulating the vapour from the lower distillation zone is located in a substantially central zone of the catalytic zone.

30. An apparatus according to claim 29, comprising at least one means for introducing a gaseous reactant into each catalytic bed in the catalytic zone.

31. An apparatus according to claim 14, in which the collecting means is principally located in a substantially central zone of the catalytic zone, the overflow means is principally located in a substantially peripheral zone of the catalytic zone and the means for circulating the vapour from the lower distillation zone is located in a substantially peripheral zone of the catalytic zone.

32. An apparatus according to claim 31, comprising at least one means for introducing a gaseous reactant into each catalytic bed in the catalytic zone.

Signed and Sealed this

Sixteenth Day of March, 1999

Q. TODD DICKINSON

*Attest:*

*Attesting Officer*

*Acting Commissioner of Patents and Trademarks*